(12) United States Patent
Dungan et al.

(10) Patent No.: US 11,453,427 B2
(45) Date of Patent: Sep. 27, 2022

(54) HANDLING DEVICE FOR TRANSPORTING COMPONENTS OF A CHECKOUT STATION

(71) Applicant: Toshiba Global Commerce Solutions Holdings Corporation, Tokyo (JP)

(72) Inventors: William Dungan, Cary, NC (US); Rodney Barr, Garner, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 37 days.

(21) Appl. No.: 16/832,591

(22) Filed: Mar. 27, 2020

(65) Prior Publication Data

US 2021/0300452 A1 Sep. 30, 2021

(51) Int. Cl.
*B62B 5/00* (2006.01)
*A47F 9/04* (2006.01)

(52) U.S. Cl.
CPC ............. *B62B 5/0086* (2013.01); *A47F 9/04* (2013.01); *A47F 2009/041* (2013.01); *B62B 2202/00* (2013.01); *B62B 2301/044* (2013.01)

(58) Field of Classification Search
CPC ............. B62B 5/0086; B62B 2202/00; B62B 2301/044; B62B 2301/05; B62B 2205/104; B62B 5/0083; A47F 9/04; A47F 2009/041; G07G 1/0027; G07G 1/0018; B60P 3/00; B60P 3/40; B65G 7/04
See application file for complete search history.

(56) References Cited

U.S. PATENT DOCUMENTS

| 2,961,250 | A | * | 11/1960 | Beach ...................... A61G 5/00 |
| | | | | 280/35 |
| 5,903,956 | A | * | 5/1999 | Theising ............... B62B 5/0083 |
| | | | | 16/19 |
| 6,162,004 | A | * | 12/2000 | Hanakawa ............. B62B 3/002 |
| | | | | 280/79.11 |

(Continued)

FOREIGN PATENT DOCUMENTS

| DE | 102010022076 B3 | * | 12/2011 | ........... B62B 5/0093 |
| GB | 2576638 A | * | 2/2020 | ........... B62B 5/0485 |

(Continued)

OTHER PUBLICATIONS

Text of GB-2576638-A (Year: 2021).*

*Primary Examiner* — James A Shriver, II
*Assistant Examiner* — Ian Bryce Shelton
(74) *Attorney, Agent, or Firm* — Coats & Bennett, PLLC

(57) ABSTRACT

A reusable handling device is specially designed for transporting components of a checkout station to a location within the store where the checkout station is installed. The handling device includes casters and is designed to removably mount to a checkout station component (e.g., bagger) having adjustable feet when there is a need to move or transport the checkout station component (e.g., during installation). Generally, the handling device is configured to extend between and engage two of the adjustable feet of the checkout station component. Two or more handling devices can be mounted to the checkout station component to move the checkout station component during installation and can be removed when finished. After the installation is complete, the handling devices can be returned to the manufacturer or supplier of the checkout station component for use in another installation.

13 Claims, 7 Drawing Sheets

(56) References Cited

U.S. PATENT DOCUMENTS

| | | | | |
|---|---|---|---|---|
| 6,371,496 B1* | 4/2002 | Balolia | ............... | B60T 1/14 |
| | | | | 188/19 |
| 7,866,546 B1* | 1/2011 | Vance | ............... | G07F 9/006 |
| | | | | 235/379 |
| 8,671,518 B2* | 3/2014 | Preschke | ............... | B65G 7/04 |
| | | | | 16/30 |
| 9,266,548 B1* | 2/2016 | Morad | ............... | A47L 13/51 |
| 10,427,701 B1* | 10/2019 | Brede | ............... | B62B 5/049 |
| 10,443,255 B1* | 10/2019 | Lee | ............... | A47F 7/148 |
| 2006/0066065 A1* | 3/2006 | Mason | ............... | A47F 3/0482 |
| | | | | 280/79.3 |
| 2006/0097468 A1* | 5/2006 | Sugrue | ............... | B62B 5/0083 |
| | | | | 280/79.11 |
| 2009/0102147 A1* | 4/2009 | Moorhead | ............... | B62B 5/0083 |
| | | | | 280/32.6 |
| 2009/0113116 A1* | 4/2009 | Thompson | ............... | G06K 17/0006 |
| | | | | 711/103 |
| 2011/0099753 A1* | 5/2011 | Preschke | ............... | B65G 7/04 |
| | | | | 16/30 |
| 2014/0279119 A1* | 9/2014 | Knoll | ............... | G06Q 20/20 |
| | | | | 705/23 |
| 2015/0084297 A1* | 3/2015 | Chouinard | ............... | B62B 5/0086 |
| | | | | 280/47.34 |
| 2017/0129516 A1* | 5/2017 | Gervais | ............... | B62B 1/12 |
| 2017/0282778 A1* | 10/2017 | Young, Jr. | ............... | B62B 5/0083 |
| 2018/0050716 A1* | 2/2018 | Tarrant | ............... | B62B 1/262 |
| 2018/0181936 A1* | 6/2018 | Gotanda | ............... | G07G 1/0027 |
| 2018/0222511 A1* | 8/2018 | Turner, Jr. | ............... | B62B 3/008 |
| 2018/0290834 A1* | 10/2018 | Bacallao | ............... | A47F 9/04 |
| 2019/0009809 A1* | 1/2019 | Newenhouse | ............... | B62B 5/0086 |

FOREIGN PATENT DOCUMENTS

| | | | | | |
|---|---|---|---|---|---|
| JP | 2003327128 A | * | 11/2003 | | |
| JP | 2004050995 A | * | 2/2004 | | |
| JP | 2017144912 A | * | 8/2017 | | |
| WO | WO-2008109157 A2 | * | 9/2008 | ............... | B62B 3/008 |
| WO | WO-2016011483 A1 | * | 1/2016 | ............... | B60P 3/075 |
| WO | WO-2017191148 A1 | * | 11/2017 | ............... | B62B 5/0093 |
| WO | WO-2018085383 A2 | * | 5/2018 | ............... | B62B 3/1476 |

* cited by examiner

HANDLING DEVICE FOR TRANSPORTING COMPONENTS OF A CHECKOUT STATION

TECHNICAL FIELD

The claimed invention relates generally to a checkout stations that enables a customer to conduct a sales transaction and, more particularly, to equipment used in the installation of a checkout station.

BACKGROUND

A checkout station commonly used in retail establishments comprises a point-of-sale (POS) station including a scanner for scanning barcodes on purchased items, a scale for weighing purchased items, a display for presenting a list of purchased items to the user, a keypad for receiving user input form the customer and a card reader or other payment device for collecting payment from the user. A table or other support surface is typically disposed on one side of the POS station and a collection unit, also called a bagger, is disposed on the other side of the POS station for bagging purchased items after they have been scanned. The POS station, support table and bagger are typically shipped separately to the site where the checkout station is installed. These components are bulky and typically shipped to the installation site on pallets. The pallets on which the components are shipped are typically too wide to fit through a conventional door so the components must be removed from the pallet and carried into the store to a location in the store where the checkout is installed.

DETAILED DESCRIPTION

The present disclosure relates generally to handling devices 100 indicated generally by the numeral for transporting components of a checkout station 10 to a location within a store where the checkout station 10 is installed. An exemplary embodiment of the handling device 100 is described herein for use in the handling of a collection unit or bagger 40 for a checkout station 10. Those skilled in the art will appreciate that the devices and methods herein described are not limited to use in the handling of the collection unit or bagger 40 but may also be used for handling other components of a checkout station 10, such as the POS station. For convenience, the same reference numbers are used throughout the following description to indicate the same or similar elements.

Figure 1:
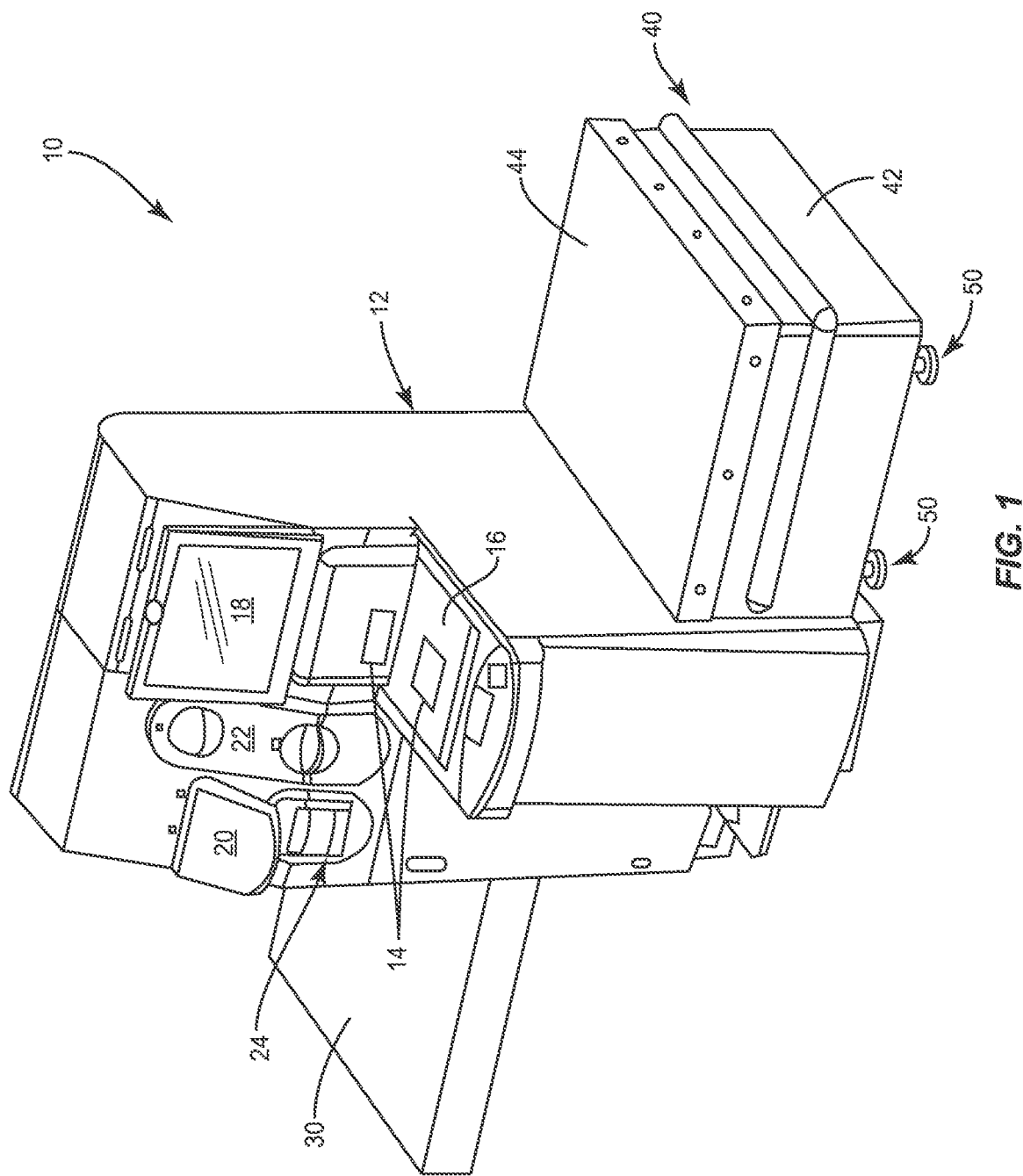
FIG. 1 illustrates a checkout station of the type typically found in a retail store.

FIG. 1 illustrates an exemplary checkout station 10 comprising a point of sale (POS) station 12, support table or shelf 30, and a collection unit 40. The collection unit is also referred to as a bagger 40. The POS station 12 includes a scanner 14 for scanning barcodes on purchased items, a scale 16 for weighing purchased items, a display 18 for outputting a list of purchased items to the customer and instructions, a keypad 20 to receive user input from the user, and a payment device 22 (e.g., bill changer) and card reader 24 for collecting payment from the customer. The support table or shelf 30 extends from one side of the POS station 12 and provides a surface for placing a shopping basket or items being purchased before those items are scanned. The collection unit or bagger 40 comprises a cabinet 42 and top 44 providing a surface to support the purchased items after the items have been scanned. The bagger 40 may further include a rack (not shown) for holding shopping bags.

During installation of the checkout station 10, the POS station 12, support shelf 30, and bagger 40 are typically shipped separately and assembled at the store where the checkout station 10 is installed. The components are typically shipped on pallets that are too large to fit through a standard 32 inch doorway. Therefore, the components of the checkout station 10 are assembled within the store where the checkout station 10 is installed.

An aspect of the present disclosure comprises a handling device 100 for moving and transporting components of the checkout station 10 after the components have been removed from pallets on which they were shipped. The handling device 100 is designed to be removably mounted to a checkout station component for use during installation. When the installation is complete, the handling devices can be removed and returned to the manufacturer or supplier for use in another installation.

Figure 2:
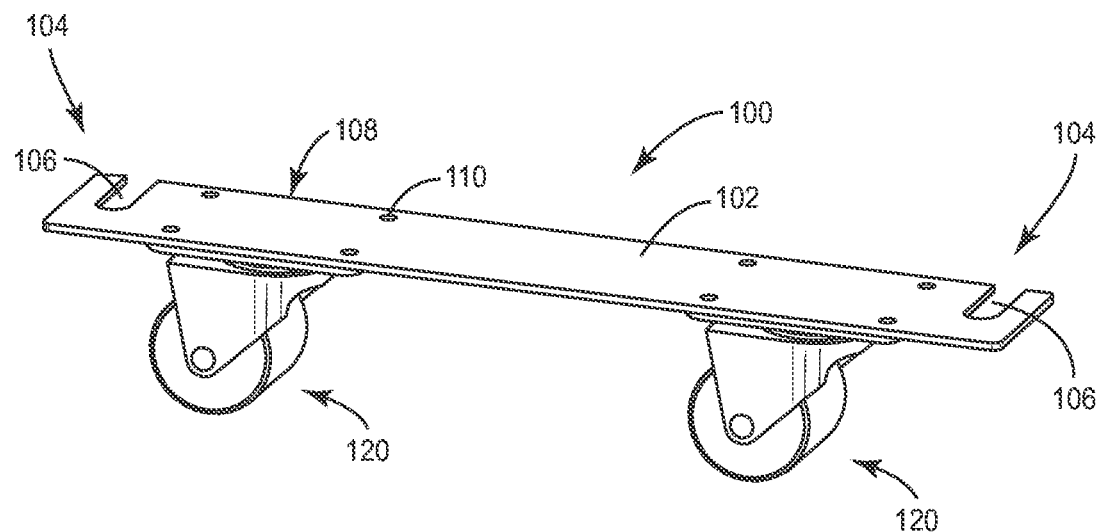
FIG. 2 is a perspective view of a handling device configured for moving a bagger or checkout station component.
Figure 3:
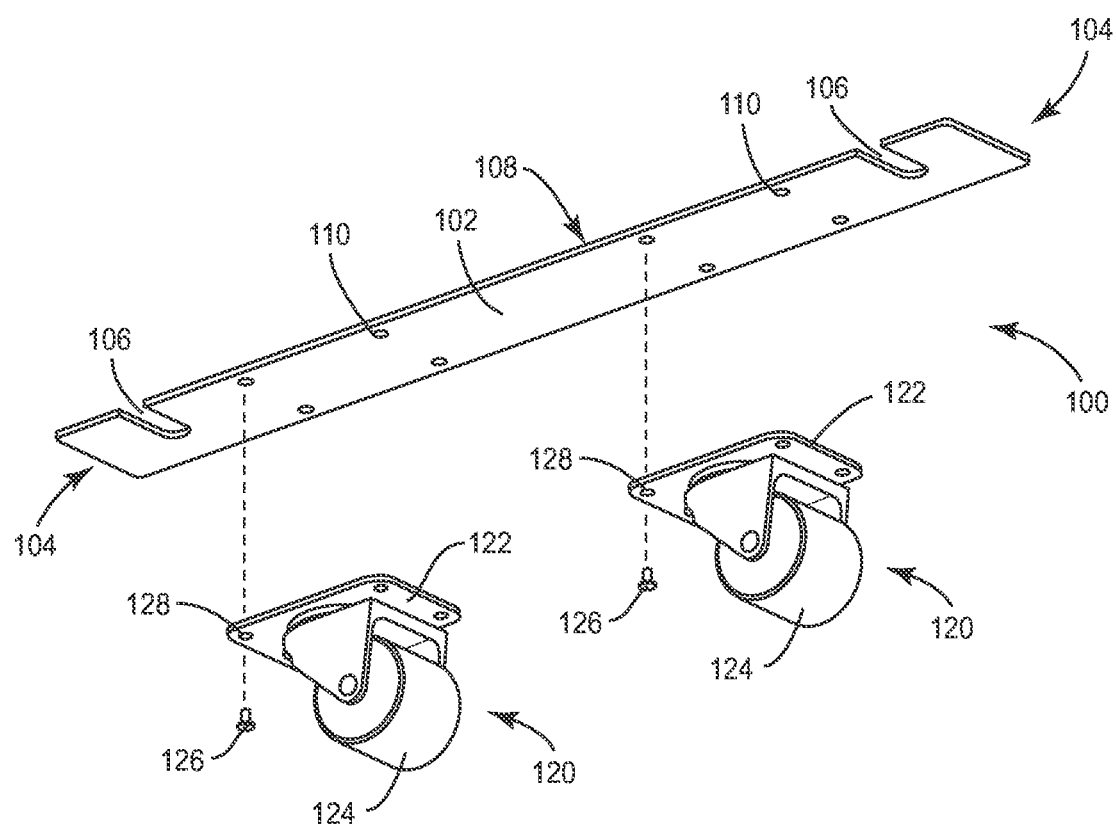
FIG. 3 is an exploded perspective view of the handling device.

FIG. 2 illustrates an exemplary reusable handling device 100 specially designed for transporting components (e.g., bagger 40) of a checkout station 10 to a location within the store where the checkout station 10 is installed. The handling device 100 includes casters 120 and is designed to removably mount to a checkout station component having adjustable feet 50 when there is a need to move or transport the checkout station component (e.g., during installation). Generally, the handling device 100 is configured to extend between and engage two of the adjustable feet 50 of the checkout station component. Two or more handling devices 100 can be mounted to the checkout station component to move the checkout station component during installation and can be removed when finished. After the installation is complete, the handling devices 100 can be returned to the manufacturer or supplier of the checkout station component for use in another installation.

The exemplary handling device 100 shown in the Figures comprises an elongated base plate 102 having a pair of casters 120 mounted at either end thereof. The base plate 102 comprises opposing end portions 104 having slots 106 formed therein. The base plate 102 further includes apertures 110 for mounting the casters 120 to the base plate 102. In one embodiment, the apertures 110 are internally threaded for mounting the casters 120 to the base plate 102 as hereinafter described.

Figure 4A:
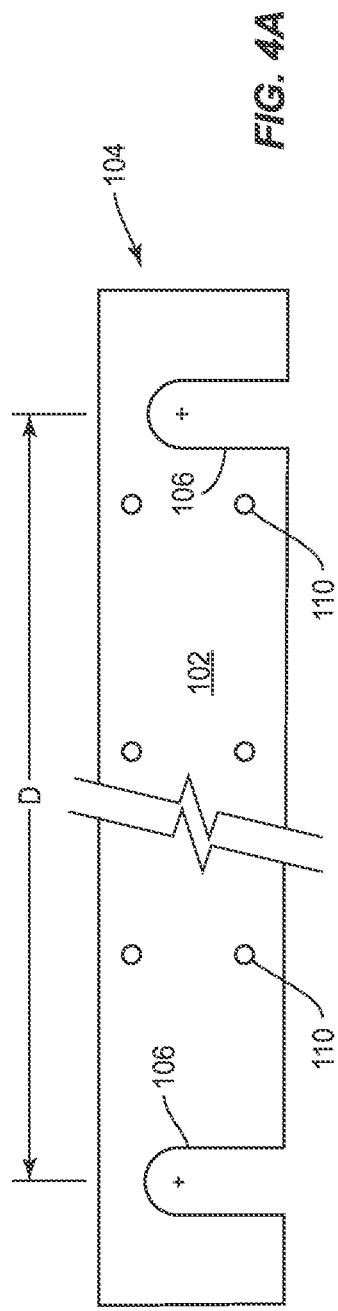
FIGS. 4A-4C show designs of the handling device showing different arrangements of the slots in the base plate of the handling device.
Figure 4B:
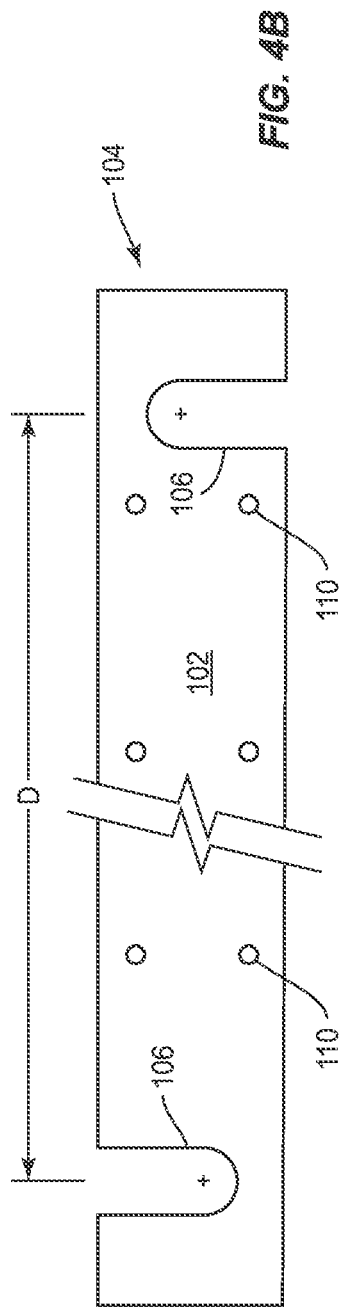
Figure 4C:
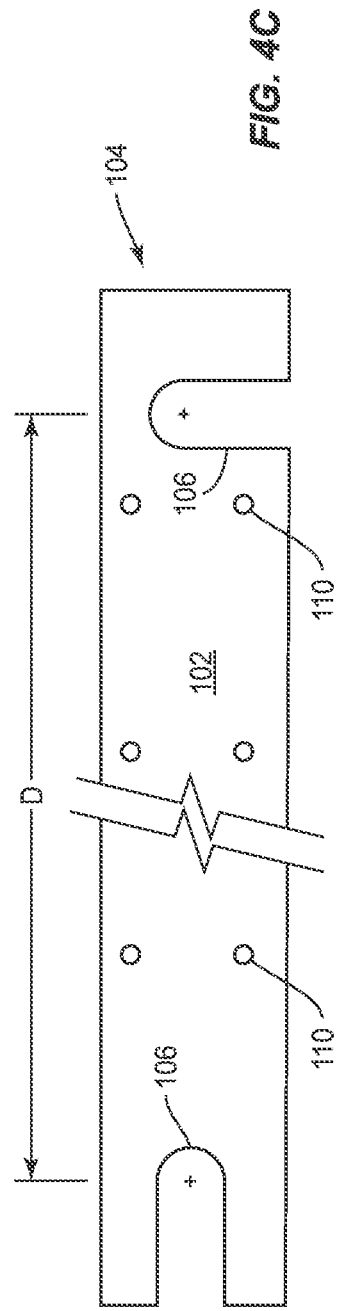

As described in more detail below, the slots 106 in the base plate 102 are specially configured to engage with adjustable feet 50 on the bottom of the checkout station component. FIGS. 4A-4B illustrate a few variations of the base plate 102 with different slot arrangements to illustrate the range of possibilities. Generally, the distance D between the slots 106 (measured between the center points near the bottom of the slots 106) equals the distance between the adjustable feet 50 on the checkout station component to enable mounting the handling device 100 to the bagger 40 as will be hereinafter described. In the embodiment shown in FIG. 4A, the slots 106 open on the same side edge 108 of the base plate 102. In the embodiment shown in FIG. 4B, the slots 106 open on opposing edges 108 of the base plate 102. In the embodiment shown in FIG. 4C, the slot 106 at one end portion of the base plate 102 opens to a side edge 108 and the slot 106 at the opposite end of the base plate 102 opens to the end of the base plate 102. In each of these arrangements the distance D between the slots 106 is the same.

Two swiveling casters 120 are mounted to the base plate 102. Those skilled in the art will recognize that the handling device 100 could include more than two casters 120 in order to support heavier loads. Each caster 120 comprises a mounting plate 122 and a swiveling caster wheel 124. The mounting plate 122 includes four mounting holes 128 that align with the apertures 110 in the base plate 102. In an exemplary embodiment, the mounting holes 128 have smooth bores and the casters 120 are secured to the base plate 102 by threaded fasteners 126 (e.g., machine screw or bolt) that pass through the mounting holes 128 in the mounting plate 122 of the caster 120 and thread into the threaded apertures 110 on the base plate 102. Those skilled in the art will appreciate that this arrangement can be reversed so that the threaded fasteners 126 pass through smooth-bore apertures 110 in the base plate 102 and thread into aligned internally threaded mounting holes 128 in the mounting plate 122 of the caster 120. Also, other fastening techniques can be employed to secure the casters 120 to the base plate 102. For example, the casters 120 can be secured to the base plate by rivets, or by welding. An advantage of using threaded fasteners 126 is that this technique allows the casters 120 to be easily and quickly replaced when the casters 120 are worn or damaged.

Figure 5:
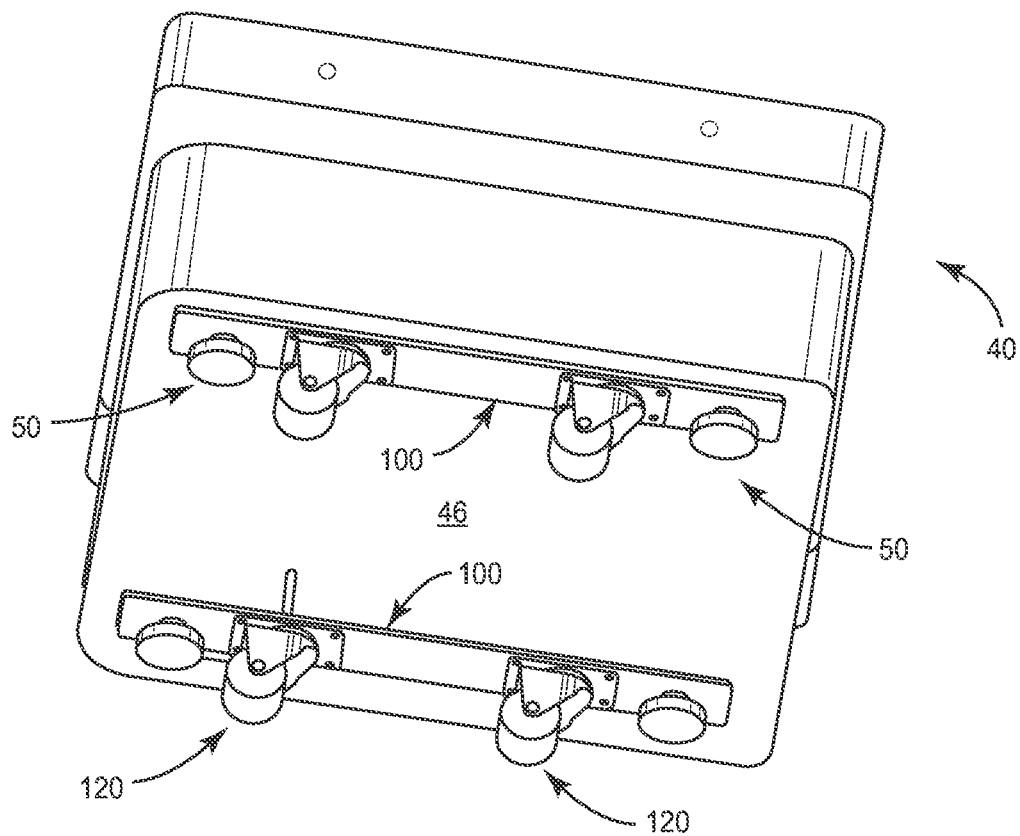
FIG. 5 is a perspective view showing the handling device secured to the bottom of a checkout station component.

In use, two handling devices 100 are secured to respective pairs of the adjustable feet 50 on a checkout station component (e.g., bagger 40) as shown in FIG. 5. Once the handling devices 100 are secured to the checkout station component, the checkout station component can be placed in an upright position such that the bagger 40 is supported by the casters 120. The checkout station component can then be moved from place to place by rolling the checkout station component on the caster 120.

Each handling device 100 is secured to the checkout station component by two or more securing devices that press upper contact areas on a top (upwardly facing) surface of the base plate 102 against upper constraints. FIGS. 6A-6D illustrate various methods of securing the handling device 100 to the adjustable feet 50 of the checkout station component. Each securing device contacts a lower contact area on the bottom (downwardly facing) surface of the base plate 102 adjacent the bottom end of a respective slot 106 and generally functions as a screw clamp that presses the base plate 102 against the matching upper constraint when the securing device is tightened against the lower contact area of the base plate 102. When the threaded shafts 52 on the adjustable feet 50 are fully inserted, i.e., seated in the bottom of the slots 106, the securing device is tightened to clamp the handling device 100 to the checkout station component.

The upper constraint may comprise a structural feature of the checkout station component (FIGS. 6A and 6B), or an adjustment nut 58 (FIG. 6C) that is disposed along the threaded shaft 52 an adjustable foot. In the latter case, the adjustment nut 58 is disposed along the threaded shaft 52 between the base plate 102 and the check station component, i.e., above the base plate 102. In this embodiment, the base plate 102 of the handling device 100 is captured between the securing device and the adjustment nut 58 on the threaded shaft 52 of the adjustable foot 50.

Figure 6A:
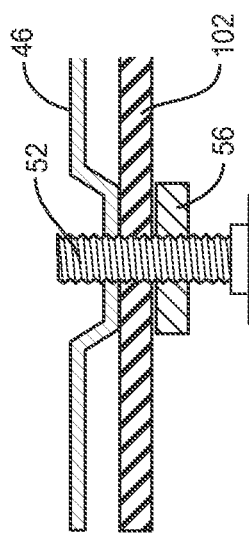
FIGS. 6A-6D illustrate various methods of securing the handling device to the bagger or other checkout station component.
Figure 6B:
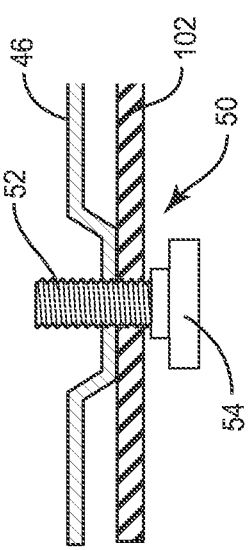
Figure 7:
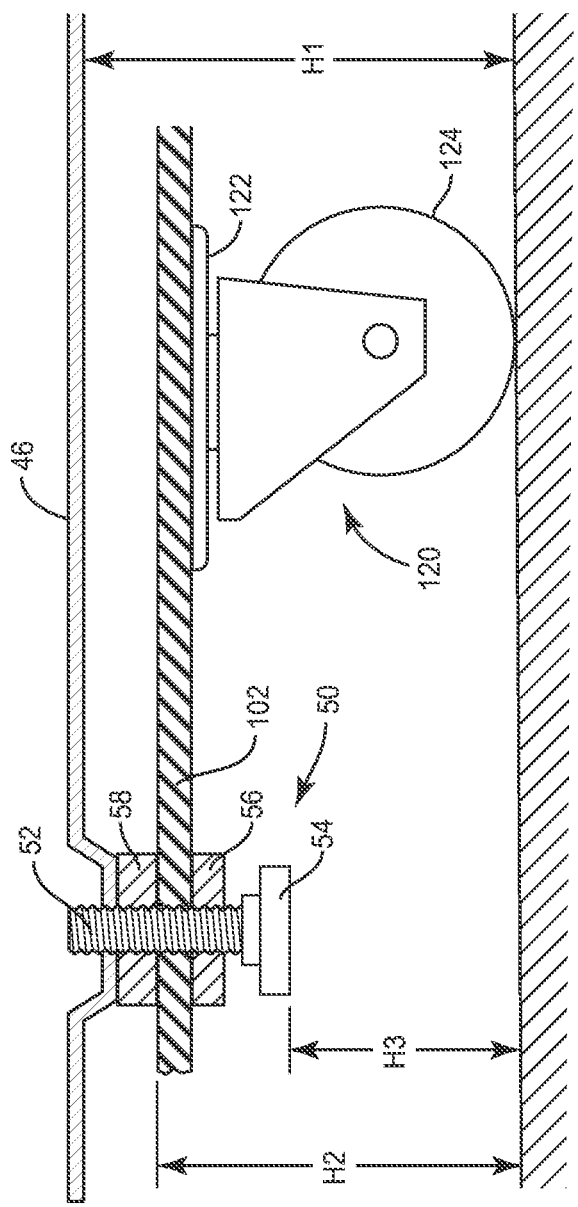
FIG. 7 is a partial section view illustrating a handling device secured to a checkout station component.

A vertical position H2 of the adjustment nut 58 along the threaded shaft 52 can be adjusted to vary a clearance height H1 between the ground and the bottom of the checkout station component as shown in FIG. 7. A benefit of this approach is that it provides a degree of flexibility in setting the clearance height H1 of the checkout station component during movement or transportation. That is, the clearance height H1 of the bagger 40, measured from the ground to the bottom surface 46 of the checkout station component can be adjusted by setting the position of the nut 58 along the threaded shaft 52. Moving the nut 58 to a point further from the bottom surface 46 and increases the clearance height H1. Moving the nut 58 closer to the bottom surface 46 reduces the clearance height H1. In contrast, the clearance height H1 in approaches shown in FIGS. 6A and 6B is fixed.

The upper constraint in some embodiments may comprise a fixed stop 60 (FIG. 6D) on the threaded shaft 52 of an adjustable foot 50 that is disposed between the base plate 102 and bottom surface 46 of the checkout station component 100. In this embodiment, the base plate 102 of the handling device 100 is captured between the securing device and the fixed stop on the threaded shaft 52 of the adjustable foot 50.

Figure 6C:
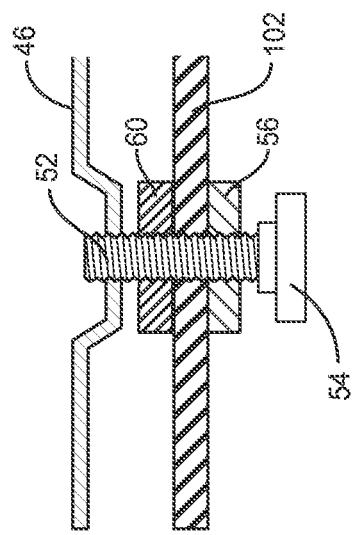
Figure 6D:
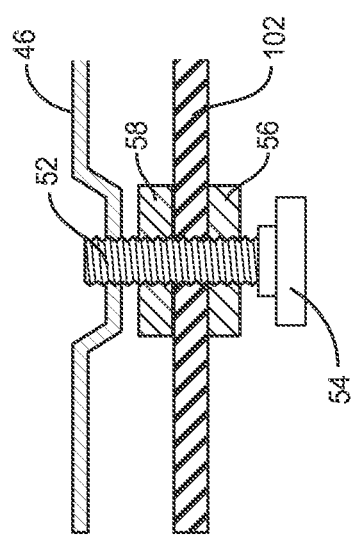

The securing device may comprise a securing nut 56 that is disposed along the threaded shaft 52 of an adjustable foot 50 (FIGS. 6B-6D). In this case, the securing nut 56 is disposed along the threaded shaft 52 between the base plate 102 and the ground, i.e., below the base plate 102. The securing nut 56 is tightened against the lower contact area on the base plate 102 to press the upper contact area of the base plate 102 against the upper constraint (FIG. 6B), which may be a structural feature of the checkout station component, an adjustment nut 58 or fixed stop 60. In this embodiment, the base plate 102 of the handling device 100 is captured between the nut 56 and the upper constraint when the securing nut 56 is tightened against the base plate 102.

In one embodiment, the adjustable feet 50 on the checkout station component serve as the securing devices. As previously noted, each adjustable foot 50 includes a footpad 54 at a lower end of the threaded shaft 52. The footpad 54 can be turned or tightened so that the footpad 54 contacts the lower contact area of the base plate 102 and presses the base plate 102 against the upper constraint, which may be a structural feature of the checkout station component, an adjustment nut 58 or fixed stop 60. In this embodiment, the base plate 102 of the handling device 100 is captured between the foot pad 54 of the adjustable foot 50 and the upper constraint when the adjustable foot 50 is tightened down against the base plate 102. With this embodiment, no tools are required for mounting or dismounting the handling device 100 to the checkout station component. Once the base plate 102 of the handling device 100 is engaged with the threaded feet 50 on the checkout station component, the threaded feet 50 can be tightened down by hand.

Figure 8:
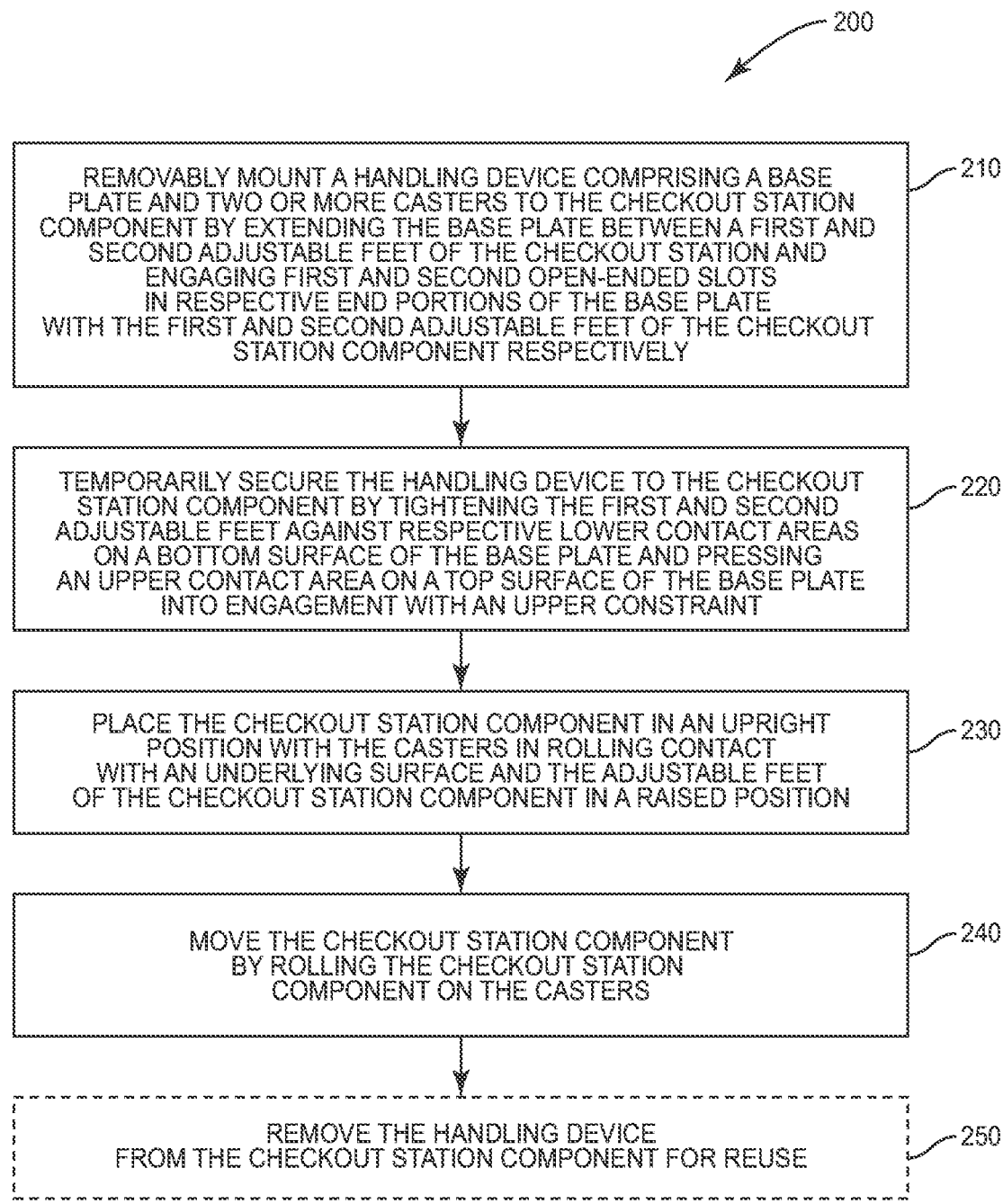
FIG. 8 illustrates an exemplary method of moving a checkout station component having adjustable feet.

Referring again to FIG. 7, the casters 120 are configured to lift the adjustable feet 50 of the checkout station component above the ground to a clearance height H3 when the handling device 100 is mounted to the checkout station component and the checkout station component is placed in an upright position. Lifting the adjustable feet 50 provides clearance between the ground and the footpads 54 while the checkout station component is moved. In some embodiments, the clearance height H3 is fixed. In others, the clearance height H3 is adjustable FIG. 8 illustrates an exemplary method 200 for moving a checkout station component, e.g., bagger 40. It is assumed that the checkout station component has been shipped to the installation site on a pallet and needs to be removed from the pallet, in order to pass through a doorway or for some other reason. It is further assumed that two handling devices 100 are required for moving the checkout station component. The method 200 is repeated for each handling device 100.

The handling device 100 is removably mounting to the checkout station component by extending the base plate 102 of the handling device 100 between a first and second adjustable feet 50 of the checkout station and engaging first and second open-ended slots 106 in respective end portions of the base plate 102 with the first and second adjustable feet 50 respectively of the checkout station component (block 210). The handling device 100 is temporarily secured to the checkout station component by tightening first and second securing devices (e.g., securing nut 56 or adjustable feet 150) against respective lower contact areas on a bottom surface of the base plate 102 and pressing an upper contact area on a top surface of the base plate 102 into engagement with an upper constraint (block 220). The checkout station component is then placed in an upright position with the casters 120 in rolling contact with the ground and the adjustable feet 50 of the checkout station in a raised position (block 230). The checkout station component can then be moved by rolling the checkout station component on the casters (block, 240). After moving the checkout station component, the handling device 100 is removed from the checkout station component for reuse at a later time (block 250).

The handling device 100 as herein described can be shipped to the installation site on a pallet with the checkout station component for use at the installation site. The handling devices 100 in this case can be easily and quickly installed to move the checkout station component into place and removed when finished for subsequent use in another installation. The handling device 100 can also be pre-installed on the checkout station component before it is shipped to speed up installation. In any case, the handling devices 100 can be shipped back to the manufacturer or supplier with the pallets at the end of the installation. The handling devices 100 eliminate the need for dollies or hand carts and avoids manually transporting the checkout station components.

What is claimed is:

1. A handling device for moving a checkout station component including adjustable feet, the handling device comprising:

an elongated base plate having first and second slots configured to extend between and engage first and second adjustable feet of the checkout station component respectively when the handling device is mounted to the checkout station component, each slot including an open end for slidably receiving a threaded shaft of a respective one of the adjustable feet; and two or more casters mounted to the base plate for supporting the checkout station component when the handing handling device is mounted to the checkout station component, each caster having a wheel in rolling contact with an underlying surface when the checkout component is placed in an upright position;

wherein the base plate includes an upper contact area on a top side of the base plate for contacting an upper constraint when the handling device is mounted to the checkout station component and a lower contact area adjacent each slot that is engaged by a threaded securing device;

wherein the threaded securing device is operative to contact the lower contact area of the base plate and press the upper contact area against the upper constraint when the securing device is tightened against the lower contact area to secure the handling device to the checkout statin component; and wherein the securing device is the adjustable foot and the adjustable foot contacts the lower contact area of the base plate and presses the upper contact area against the upper constraint when the adjustable foot is tightened against the lower contact area to secure the handling device to the checkout station component; and wherein the upper constraint comprises a surface on the checkout station component.

2. The handling device of claim 1 wherein the open ends for the first and second slots are along opposing side edges.

3. The handling device of claim 1 wherein the open ends for both the first and second slots are along one side edge.

4. The handling device of claim 1 wherein the open end for the first slot is along a side edge of the base plate and the open end for the second slot is at an end of the base plate.

5. The handling device of claim 1 wherein the threaded securing device comprises a nut disposed on the threaded shaft of the adjustable foot that contacts the lower contact area of the base plate and presses the upper contact area against the upper constraint when the threaded nut is tightened against the lower contact area.

6. The handling device of claim 5 wherein the upper constraint comprises a second nut disposed along the threaded shaft of the adjustable foot.

7. The handling device of claim 1 wherein a vertical position of the upper constraint is adjustable to vary a clearance height of the checkout station component.

8. The handling device of claim 1 wherein the caster is configured to lift the adjustable feet of the checkout station component above the ground when the handling device is mounted to the checkout station component.

9. A handling device for moving a checkout station component including adjustable feet, the handling device comprising:

an elongated base plate having first and second slots configured to extend between and engage first and second adjustable feet of the checkout station component respectively when the handling device is mounted to the checkout station component, each slot including an open end for slidably receiving a threaded shaft of a respective one of the adjustable feet;

two or more casters mounted to the base plate for supporting the checkout station component when the handling device is mounted to the checkout station component, each caster having a wheel in rolling contact with an underlying surface when the checkout component is placed in an upright position, wherein the casters are configured to lift the adjustable feet of the checkout station component above the ground when the handling device is mounted to the checkout station component;

an upper contact area on a top surface of the base plate configured to engage an upper constraint when the handling device is mounted to the checkout station component;

lower contact areas on a bottom surface of the base plate adjacent bottom ends of respective slots, each lower contact area being configured for engagement by the respective adjustable foot when the handling device is mounted to the checkout station component, wherein the respective adjustable foot is operative to press the upper contact area into engagement with the upper constraint when tightened against the lower contact area to secure the handling device to the checkout station component; and wherein the upper constraint comprises a surface on the checkout station component.

10. The handling device of claim 9 wherein the open ends for the first and second slots are along opposing side edges.

11. The handling device of claim 9 wherein the open ends for both the first and second slots are along one side edge.

12. The handling device of claim 9 wherein the open end for the first slot is along a side edge of the base plate and the open end for the second slot is at an end of the base plate.

13. The handling device of claim 9 wherein a vertical position of the upper constraint is adjustable to vary a clearance height of the checkout station component.

* * * * *